United States Patent
Wittrock

(10) Patent No.: US 8,326,670 B2
(45) Date of Patent: Dec. 4, 2012

(54) PEGGING RESOURCES TO SHIPMENTS IN A PRE-EXISTING PRODUCTION PLAN

(75) Inventor: Robert James Wittrock, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1120 days.

(21) Appl. No.: 12/061,801

(22) Filed: Apr. 3, 2008

(65) Prior Publication Data
US 2008/0255913 A1    Oct. 16, 2008

Related U.S. Application Data

(63) Continuation of application No. 10/953,181, filed on Sep. 30, 2004, now abandoned.

(51) Int. Cl.
*G06Q 10/00* (2012.01)
(52) U.S. Cl. .................................................. 705/7.25
(58) Field of Classification Search ............... 705/7.25
See application file for complete search history.

(56) References Cited

U.S. PATENT DOCUMENTS

| | | | |
|---|---|---|---|
| 5,548,518 A | | 8/1996 | Dietrich et al. |
| 5,630,070 A | * | 5/1997 | Dietrich et al. ............. 705/7.23 |
| 5,953,707 A | * | 9/1999 | Huang et al. ................. 705/7.25 |
| 5,971,585 A | * | 10/1999 | Dangat et al. ................ 700/102 |
| 6,049,742 A | * | 4/2000 | Milne et al. ..................... 700/99 |
| 6,272,389 B1 | | 8/2001 | Dietrich |
| 2003/0065415 A1 | * | 4/2003 | Hegde et al. .................. 700/100 |
| 2003/0158769 A1 | * | 8/2003 | Uno et al. ......................... 705/8 |
| 2004/0078259 A1 | * | 4/2004 | Allan et al. ..................... 705/10 |
| 2004/0210467 A1 | * | 10/2004 | Yokoyama ........................ 705/8 |
| 2005/0137919 A1 | * | 6/2005 | Buckley et al. ................... 705/7 |

OTHER PUBLICATIONS

Bretthauer, K. and Shetty, B., A petting algorithm for the nonlinear resource allocation problem, Jul. 1, 1999, Computers & Operations Research, 29 (202), 505-527.*

* cited by examiner

*Primary Examiner* — Johnna Loftis
*Assistant Examiner* — Brandi P Parker
(74) *Attorney, Agent, or Firm* — Whitham, Curtis, Christofferson & Cook, P.C; Daniel P. Morris

(57) ABSTRACT

In software systems for resource-constrained production planning (RCPP), it is often beneficial to determine a detailed association, or "pegging", between the resources and the shipments that are enabled by those resources. Presented here is a software-implemented method for constructing a pegging of a production plan for an RCPP problem. The method is called "Pegging By Explosion" (PBE). This method, takes a feasible production plan and reconstructs it, using its own specialized incremental allocation technique. A Pegging By Monitoring technique is applied to this reconstruction in order to produce the pegging. The reconstruction is accomplished by a specialized "explosion" technique related to the explosion technique of Material Requirements Planning (MRP).

11 Claims, 5 Drawing Sheets

PEGGING RESOURCES TO SHIPMENTS IN A PRE-EXISTING PRODUCTION PLAN

This is a continuation of U.S. Ser. No. 10/953,181 filed Sep. 30, 2004, now abandoned, and which is incorporated by reference.

BACKGROUND OF THE INVENTION

1. Field of the Invention

The present invention generally relates to manufacturing resource planing, and more particularly to software systems for resource-constrained production planning.

2. Background Description

Software systems for resource-constrained production planning (RCPP) take as input data a description of a production planning problem. This includes a listing of the basic data objects of the problem; i.e., capacity resources, raw material resources, subassemblies, final products, and demands for the products, as well as a multi-level Bill-Of-Resources network that defines how the products can be produced from subassemblies, raw materials and capacities. It also includes various attributes on these objects such as supply volumes, demand volumes, production usage rates, and economic data or priorities. In addition, the problem data is defined with respect to a set of discrete time periods.

Given these inputs, an RCPP system computes a production plan that consists of two portions: (1) a production portion of plan that specifies of how much of each product is to be produced in each time period, and (2) a shipment portion of the plan that specifies how much of each demand is to be fulfilled in each time period. (The fulfillment of a demand in a period may be called a "shipment" to that demand.) The production plan computed by the RCPP system is normally required to be feasible, meaning it satisfies the resource constraints that are specified in the input data.

Two methods for solving the RCPP problem are described in U.S. Pat. No. 5,548,518 for "Allocation Method for Generating a Production Schedule" and U.S. Pat. No. 5,630,070 for "Optimization of Manufacturing Resource Planning", both to Dietrich et al. More specifically, U.S. Pat. No. 5,548,518 discloses an allocation method which, in response to a specified requirement, determines what quantity of a product can be produced with a specified quantity of supply components, allocates a required quantity of supply components for filling a defined partial order and fills a remainder of the requirement at some later time. U.S. Pat. No. 5,630,070 discloses a method for constrained material requirements planning, optimal resource allocation and production planning which optimizes a manufacturing process by designating the amounts of various manufactured products to be produced, which products include both end products as well as subassemblies.

Users of RCPP systems frequently desire more information than just the production plan itself. One question that is often asked is, "For any given shipment in the production plan, which resources were utilized specifically to enable that shipment?" Generally, this information is not evident in the production plan itself. The production plan specifies which resources are used and which demands are met, but it does not provide an association between the two. This may be called "the pegging problem" for RCPP; that is, given an RCPP problem and a corresponding feasible production plan, define an association between the individual resources that are utilized in the plan and the individual shipments in the plan. Such an association is called a "pegging" of the production plan. A resource that is associated with a particular shipment is said to be "pegged" to it.

Users of RCPP systems have many uses for a pegging of a production plan, including the following:

Verifying the validity of the production plan.
Verifying the validity of the input data.
Identifying which demands are responsible for depleting the supplies of critical (i.e., bottleneck) resources.
Identifying opportunities to improve the production plan by increasing the supplies of the resources that were used by the most important demands.
Generally deepening the user's understanding of the production plan.

One possible method for computing a pegging might be called "Pegging By Monitoring". This technique would apply when the RCPP system solves the RCPP problem by an "incremental allocation" technique, as disclosed for example in U.S. Pat. No. 5,548,518. An incremental allocation technique for RCPP has the following key properties:

It starts with an empty production plan.
It proceeds by iterations.
Each iteration creates only one new shipment.
As the technique progresses, the production volume for any product in any period can be increased, but it can never be decreased.

The "Pegging By Monitoring" technique would proceed by monitoring the incremental allocation technique; that is, whenever a production volume of a product is increased by the incremental technique, that increase is pegged to the shipment for the current iteration.

In some respects, "Pegging By Monitoring" is a very appealing form of pegging. It s a direct reflection of what how the production plan was built up by the incremental allocation technique. But it has the following drawbacks:

It can only be applied, if the production plan is being computed by an incremental allocation technique.
It must be integrated with the RCPP solver itself; it cannot be applied to a production plan that has already been computed.

SUMMARY OF THE INVENTION

It is therefore an object of the present invention to provide a method for solving the pegging problem in a resource-constrained production planning system which avoids the problems of the "Pegging By Monitoring" approach.

According to the invention, there is provided a method for constructing a pegging of a production plan for the RCPP problem which is called herein "Pegging By Explosion" (PBE). The Pegging By Explosion technique takes a feasible production plan and reconstructs it, using its own specialized incremental allocation technique. The Pegging By Monitoring technique (described above) is applied to this reconstruction in order to produce the pegging. The reconstruction is accomplished by a specialized "explosion" technique related to the well-known explosion technique of Material Requirements Planning (MRP). (For details above MRP, see *Manufacturing Planning and Control Systems*, by T. E. Vollmann, W. L. Berry, and D. C. Whybark, McGraw-Hill, 4th ed., Mar. 1, 1997). A conventional MRP explosion technique would usually not be able to reconstruct an arbitrary production plan to an RCPP problem. In contrast, the explosion technique used by PBE does so, by making use of detailed knowledge of the production plan itself.

The advantages of using the Pegging By Explosion technique instead of the Pegging By Monitoring technique are as follows:

It can be used regardless of how the production plan was generated.

It does not need to be integrated with the RCPP solver.

Note that a pegging of a production plan is not uniquely determined by the production plan itself: For any given feasible production plan, there will normally be many different possible peggings. In light of this, it is important to construct a pegging that a user is likely to find "plausible". Specifically, it should be plausible that the resources that are pegged to a particular shipment were precisely those resources that made that shipment possible. The PBE technique of the present invention constructs a pegging that is guaranteed to satisfy this "plausibility" condition.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

The invention disclosed here is a novel method for constructing a pegging of a production plan for an RCPP problem. The technique is called "Pegging By Explosion" (PBE).

The Pegging By Explosion technique takes a feasible production plan and reconstructs it, using its own specialized incremental allocation technique. The Pegging By Monitoring technique (described above) is applied to this reconstruction in order to produce the pegging. The reconstruction is accomplished by a specialized "explosion" technique related to the well-known explosion technique of Material Requirements Planning (MRP). (For details above MRP, see Manufacturing Planning and Control Systems, by T. E. Vollman, W. L. Berry, and D. C. Whybark.) A conventional MRP explosion technique would usually not be able to reconstruct an arbitrary production plan to an RCPP problem. In contrast, the explosion technique used by PBE does so by making use of detailed knowledge of the production plan itself.

Figure 1:
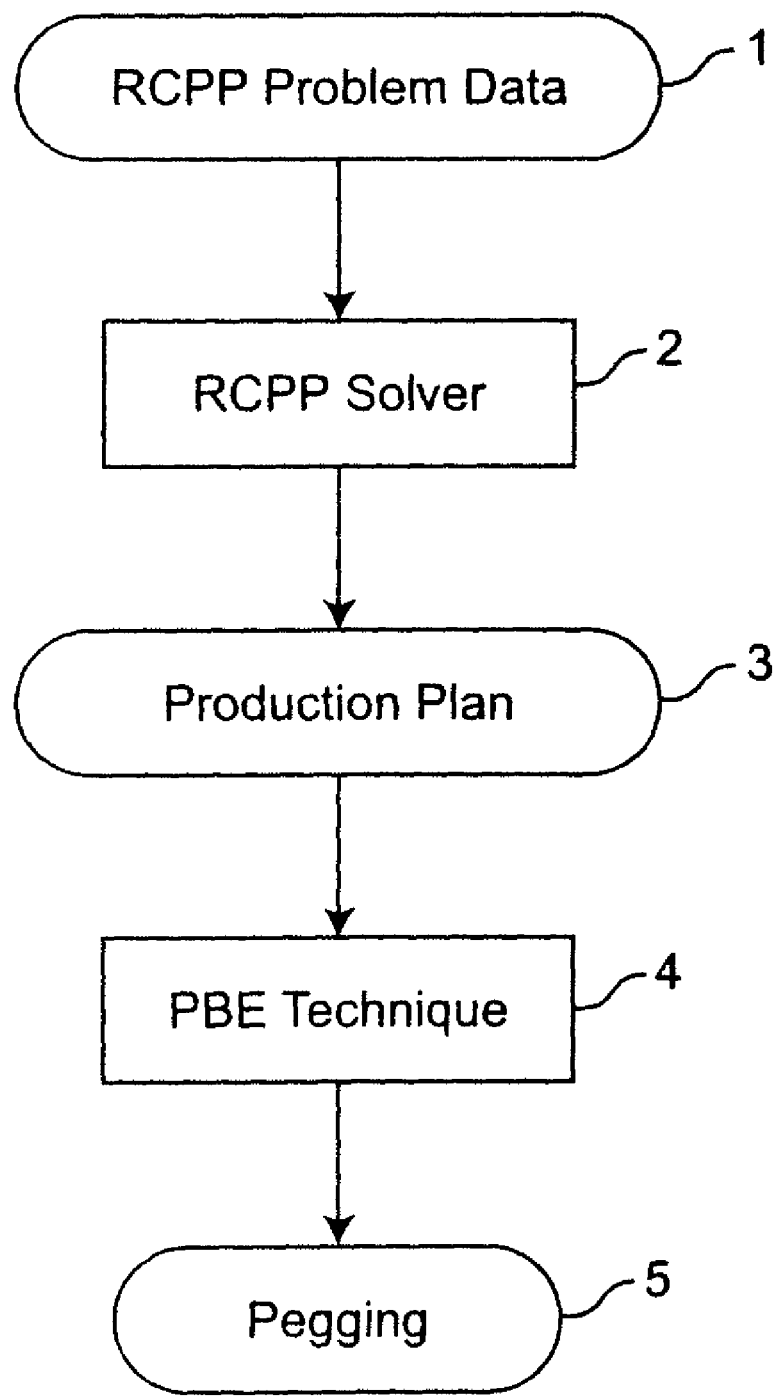
FIG. 1 is a data flow diagram illustrating the PBE technique in the context of an RCPP system.

The data flow for the PBE technique in the context of an RCPP system is illustrated in FIG. 1. As shown in FIG. 1, the RCPP problem data 1 is input to the RCPP solver 2, which produces a production plan 3. The Pegging by Explosion (PBE) technique 4 according to the present invention is applied to the thus produced production plan 3, yielding the pegging 5 of the production plan.

The advantages of using the Pegging By Explosion technique instead of the Pegging By Monitoring technique are as follows:

It can be used regardless of how the production plan was generated.

It does not need to be integrated with the RCPP solver.

Note that a pegging of a production plan is not uniquely determined by the production plan itself: For any given feasible production plan, there will normally be many different possible peggings. In light of this, it is important to construct a pegging that a user is likely to find "plausible". Specifically, it should be plausible that the resources that are pegged to a particular shipment were precisely those resources that made that shipment possible. Hereinafter, a precise mathematical condition will be defined that formalizes of the idea of a plausible pegging. The PBE technique constructs a pegging that is guaranteed to satisfy this "plausibility" condition.

This is an algorithmic invention. It would be implemented in computer software, normally as an additional capability of an RCPP system, although in principle, it could be implemented as a stand-alone software tool.

Before describing the PBE technique, the underlying RCPP problem must be defined.

The RCPP Problem

An RCPP problem is built up out of several kinds of data objects:

Periods: A period represents a distinct interval of time, such as a day, a week, two months, a year, etc. The periods in an RCPP problem need not be of uniform duration. The periods are represented by the integers from 1 to Nperiods, the number of periods.

Resources: These represent capacity resources, raw material resources, subassembly resources, and even the final products themselves.

Materials: These are resources that remain available in the next period, if they are not used in a given period.

Capacities: These are resources that do not remain available in the next period, if they are not used in a given period. Each resource is either a material or a capacity, but not both.

Products: These are the resources that can be produced. They may be either materials or capacities.

Operations: An operation represents a means by which a particular product can be produced. Each operation produces exactly one product; each product is produced by one or more operations. If a product is produced by more than one operation, this simply indicates that there is more than one way to produce that product.

Demands: Each demand is associated with a resource and represents demand for that resource. Each resource is associated with zero or more demands.

Let

AllPer=The set of all periods=$\{1, 2, \ldots, \text{Nperiods}\}$

AllRes=The set of all resources

AllMat=The set of all materials (Thus, AllMat $\subseteq$ AllRes.)

AllCap=The set of all capacities (Thus, AllCap $\subseteq$ AllRes.)

AllOpn=The set of all operations

AllDem=The set of all demands $\forall d \in$ AllDem:

Let DemRes (d)=The resource demanded by demand d.

$\forall r \in$ AllRes:

Let ResDems (r)=$\{d \in \text{AllDem} | r = \text{DemRes}(d)\}$ $\forall j \in$ AllOpn:

Let ProdRes (j)=The resource produced by operation j.

$\forall r \in$ AllRes:

Let ProdOpns (r)=$\{j \in \text{AllOpn} | r = \text{ProdRes}(j)\}$

[These are the "producing operations" for resource r.]

[Resource r is a product, if and only if ProdOpns (r)$\neq \emptyset$.]

∀j∈ AllOpn:
  Let BOR (j)=The set of all resources that must be consumed by operation j in order to produce ProdRes (j). This is the "Bill-Of-Resources" of operation j.
∀r∈ AllRes:
  Let ConsOpns (r)={j∈AllOpn|r∈BOR(j)}
  [These are the "consuming operations" of resource r.]

Given any resource r and any period tr, there is an associated nonnegative quantity, SupplyVol (r, tr) ("supply volume"), that specifies the amount of resource r that is available as supply in period tr. Given any demand d and any period td, there is an associated nonnegative quantity, DemandVol (d, td) ("demand volume"), that specifies the amount of resource DemRes (d) that is demanded by demand d in period td.

Given any operation j, any period tj, any resource r∈BOR (i), and any period tr, there is an associated quantity, UsageRate (i, tj, r, tr) ("usage rate"), that specifies the amount of resource r that must be consumed in period tr for each unit of ProdRes (i) that is produced by operation j in period tj. Note that UsageRate (i, tj, r, tr) may be negative. This indicates that, when operation j produces ProdRes (j) in period tj, it consumes a negative amount of resource r in period tr. This can be used to model operations that have two or more outputs: ProdRes (j) is the main product, while resources r∈BOR (j) with UsageRate (j, tj, r, tr)<0 are by-products. Many MRP databases contain negative usage rates in their BOR data.

With each resource r, there is an associated integer, ResIdx (r) ("resource index"), distinct for each resource. This index defines an ordering for the resources and has the following property:
∀j∈AllOpn, tj∈AllPer, ∀r∈BOR (j), tr∈AllPer:
  If UsageRate (j, tj, r, tr)>0, then:
    ResIdx (ProdRes (j))>ResIdx (r).
Finally, there would also be economic or priority data associated with the resources, operations, and demands, but this data is not necessary for defining a pegging technique.

A solution to an RCPP problem is a production plan. Given any operation, j, and any period, tj, the production plan specifies an associated quantity, ProdVol (j, tj) ("production volume") that represents the amount of resource ProdRes (j) that is to be produced by operation j in period tj. Given any resource, r, and any period, tr, the production plan specifies an associated quantity, StockVol (r, tr) ("stock volume") that represents the amount of resource r that is to be carried over from period tr to period tr+1. If r is a capacity, then StockVol (r, tr)=0. For notational convenience, let StockVol (r, 0)=0. Given any resource, r, and any period, tr, the production plan specifies an associated quantity, ConsSupVol (r, tr) ("consumed supply volume") that represents the amount of the supply of resource r from period tr that is consumed in any period. Given any demand, d and any period td, the production plan specifies an associated quantity, ShipVol (d, td) ("shipment volume") that represents the quantity of the demand that is to be fulfilled (i.e., "shipped") in period td. The collection of production volumes of all operations, stock volumes and consumed supply volumes of all resources, and shipment volumes of all demands constitutes the production plan.

Given a production plan, the following further quantities may be defined:

$\forall r \in AllRes, \forall tr \in AllPer:$ $$\text{Let } TotShipVol(r, tr) = \sum_{d \in ResDems(r)} ShipVol(d, tr)$$

-continued $$\text{Let } TotProdVol(r, tr) = \sum_{j \in ProdOpns(r)} ProdVol(j, tr)$$

$$\text{Let } ConsVol(r, tr) = \sum_{\substack{j \in ConsOpns(r) \\ tj \in AllPers}} UsageRate(j, tj, r, tr) \cdot ProdVol(j, tj)$$

TotShipVol (r, tr) is the total amount of resource r that is shipped in period tr ("total shipment volume"). TotProdVol (r, tr) is the total amount of resource r that is produced in period tr ("total production volume"). ConsVol (r, tr) is the amount of resource r that is consumed in period tr ("consumption volume"). Note that, if r is not a product, then TotProdVol (r, tr)=0. A production plan is required to satisfy the following constraints:

$\forall j \in AllOpn, \forall tj \in AllPer:$ $ProdVol(j, tj) \geq 0$[non-*negativity* constraints]

$\forall d \in AllDem, \forall td \in AllPer:$ $ShipVol(d, td) \geq 0$[non-negativity constraints]

$\forall r \in AllMat, \forall tr \in AllPer:$ $StockVol(r, tr) \geq 0$[non-negativity constraints]

$\forall r \in AllCap, \forall tr \in AllPer:$ $StockVol(r, tr) = 0$ [non-stocking constraints]

$\forall r \in AllRes, \forall tr \in AllPer:$ $ConsSupVol(r, tr) \geq 0$ [non-negativity constraints]

$\forall r \in AllRes, \forall tr \in AllPer:$ $ConsSupVol(r, tr)$ [$SupplyVol(r, tr)$][supply constraints]

$\forall d \in AllDem, \forall td \in AllPer:$ $$\sum_{td'=1}^{td} ShipVol(d, td') \leq \sum_{td'=1}^{td} DemandVol(d, td')[\text{demand contraints}]$$

$\forall r \in AllRes, \forall tr \in AllPer:$ $TotShipVol(r, tr) + ConsVol(r, tr) + StockVol(r, tr) \leq$ $ConsSupVol(r, tr) + TotProdVol(r, tr) +$ $StockVol(r, tr-1)$ [resource contraints]

A production plan that satisfies all of the above constraints is said to be feasible.

An important special case of the RCPP problem is the Positive Consumption RCPP problem. An RCPP problem is defined to be a Positive Consumption RCPP (PC RCPP) problem, if it has the following property:
∀j∈AllOpn, tj∈AllPer, ∀r∈BOR (j), tr∈ AllPer:
  UsageRate (i, tj, r, tr)≧0
Note that this implies the following property:
∀j∈AllOpn, ∀r∈BOR (j):
  ResIdx (ProdRes (j))>ResIdx (r).

Precise Definition of Pegging

Given an RCPP problem and feasible production plan for it, a pegging of the production plan has three portions: (1) a production pegging, (2) a stock pegging, and a (3) supply pegging. Given any operation j, any period tj, any demand d, and any period td, a production pegging specifies an associated quantity, PgdProdVol (j, tj, d, td) ("pegged production volume"). This is the portion of ProdVol (j, tj) that is pegged to the shipment of demand d in period td.

A production pegging must satisfy the following two constraints:

$\forall j \in AllOpn, \forall tj \in AllPer, \forall d \in AllDem, \forall td \in AllPer.$ $PgdProdVol(j, tj, d, td) \geq 0$ [non-negativity constraints]

$\forall j \in AllOpn, \forall tj \in AllPer.$ $$\sum_{\substack{d \in AllDems \\ td \in AllPers}} PgdProdVol(j, tj, d, td) \leq ProdVol(j, tj)$$

[total pegging constraints]

Similarly, given any resource r, any period tr, any demand d, and any period td, a stock pegging specifies an associated quantity, PgdStockVol (r, tr, d, td) ("pegged stock volume"). This is the portion of StockVol (r, tr) that is pegged to the shipment of demand d in period td.

A stock pegging must satisfy the following two constraints:

$\forall r \in AllRes, \forall tr \in AllPer, \forall d \in AllDem, \forall td \in AllPer.$ $PgdStockVol(r, tr, d, td) \geq 0$ [non-negativity constraints]

$\forall r \in AllRes, \forall tr \in AllPer.$ $$\sum_{\substack{d \in SllDems \\ td \in AllPers}} PgdStockVol(r, tr, d, td) \leq StockVol(r, tr)$$

[total pegging constraints]

Note that this implies that PgdStockVol (r, tr, d, td)=0, if r is a capacity.

Finally, given any resource r, any period tr, any demand d, and any period td, a supply pegging specifies an associated quantity, PgdConsSupVol (r, tr, d, td) ("pegged consumed supply volume"). This is the portion of ConsSupVol (r, tr) that is pegged to the shipment of demand d in period td.

A supply pegging must satisfy the following two constraints:

$\forall r \in AllRes, \forall tr \in AllPer, \forall d \in AllDem, \forall td \in AllPer.$ $PgdConsSupVol(r, tr, d, td) \geq 0$ [non-negativity constraints]

$\forall r \in AllRes, \forall tr \in AllPer.$ $$\sum_{\substack{d \in AllDems \\ td \in AllPers}} PgdConsSupVol(r, tr, d, td) \leq ConsSupVol(r, tr)$$

[total pegging constraints]

A pegging of a production plan for an RCPP problem is simply a production pegging, stock pegging, and supply pegging that satisfy the above six constraints. The total pegging constraints enforce a requirement that any quantity of production, stock, or supply that is pegged to one shipment cannot be pegged to any other. Note that the total pegging constraints are inequality constraints. This reflects the fact that it is acceptable for some portion of the production, stock, and supply not to be pegged to any shipment.

Plausible Peggings

The "Feasible Partitioning" Property

Given an RCPP problem, a feasible production plan for it, and a pegging of the production plan, and given any demand, d* and any period, td*, the pegged production plan for (d*, td*) is defined as follows:

ShipVol$^P$ (d*, td*)=ShipVol (d*, td*)
$\forall d \in AllDem, \forall td \in AllPer$:
  If d≠d* or td≠td*, then ShipVol$^P$ (d, td)=0
$\forall j \in AllOpn, \forall tj \in AllPer$:
  ProdVol$^P$ (i, tj)=PgdProdVol (i, tj, d*, td*)
$\forall r \in AllRes, \forall tr \in AllPer$:
  StockVol$^P$ (r, tr)=PgdStockVol (r, tr, d*, td*)
  ConsSupVol$^P$ (r, tr)=PgdConsSupVol (r, tr, d*, td*)

The pegging is defined to be a feasible partitioning of the production plan if, for each demand d* and each period td*, the pegged production plan for (d*, td*) is feasible. Informally, this means that the pegging has partitioned the production plan into a set of disjoint portions associated with each shipment, where each portion defines a feasible production plan for achieving its corresponding shipment. This is a precise way of saying that the pegging is plausible.

In the context of a Positive Consumption RCPP problem, the pegging constructed by the PBE technique is guaranteed to be a feasible partitioning.

The Shipment Sequence

In addition to an RCPP problem and a production plan, the PBE technique optionally accepts one extra item of input data: a shipment sequence, ShipSeq. This is an ordered list of triples (d, td, IncShipVol), where d∈AllDem, td∈AllPer, and IncShipVol≥0 ("incremental shipment volume"). The shipment sequence is required to satisfy the following constraints:

$\forall d \in AllDem,$ $$\forall td \in AllPer. \sum_{(d, td, IncShipVol) \in ShipSeq} IncShipVol = ShipVol(d, td)$$

In essence, a shipment sequence is simply the set of all shipments in the production plan arranged into some specific order, where the shipments may be broken into partial shipments that can be interlaced within the sequence.

The shipment sequence is optional input, because the PBE technique can easily generate one by default. For a default shipment sequence. it can simply go through the periods in order, and for each period, it can go through the demands in any order:
{(demand #1, period #1, shipVol (demand #1, period #1)),
(demand #2, period #1, shipVol (demand #2, period #1)),
..., 
(demand #1, period #2, shipVol (demand #1, period #2)),
...}

By specifying a non-default shipment sequence, the user can exercise some control over the pegging that will result: The resources that the PBE technique pegs first will be pegged to the shipments that appear earliest in the shipment sequence.

Figure 2:
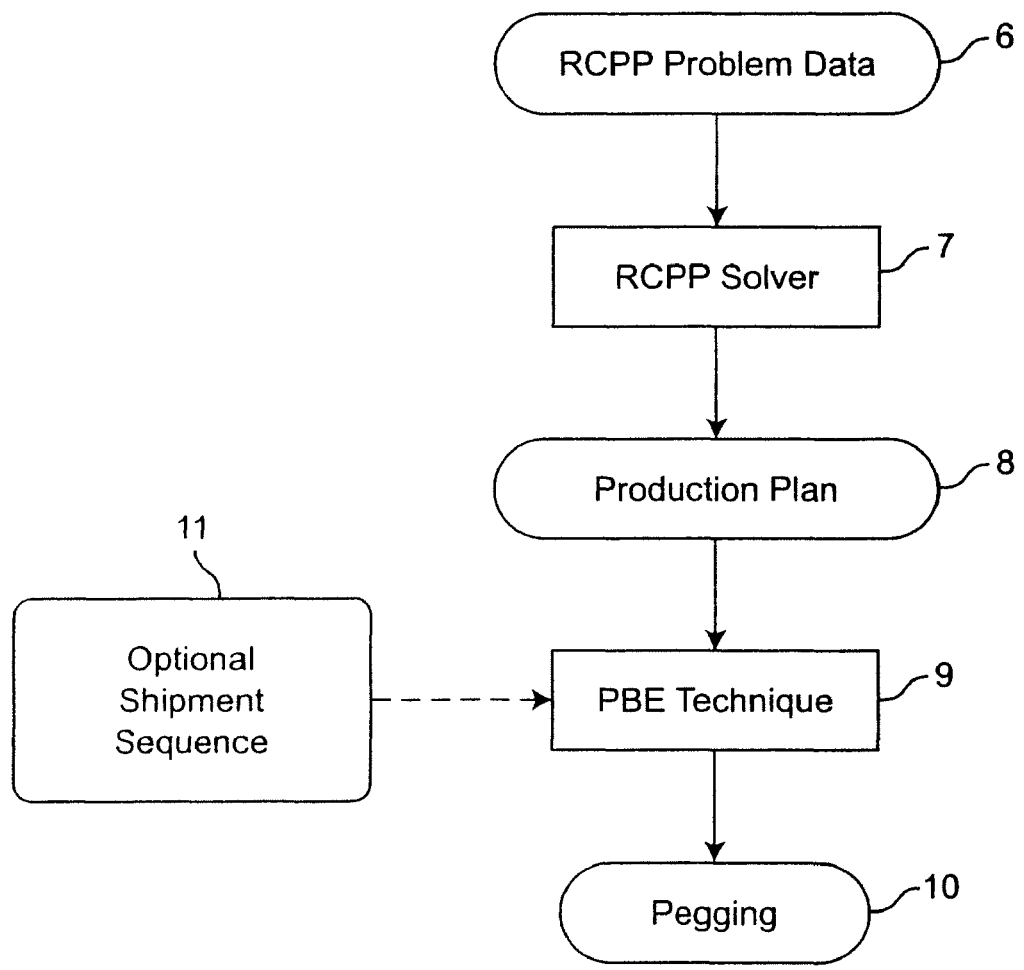
FIG. 2 is a data flow diagram similar to FIG. 1 with the addition of a shipment sequence.

The data flow for the PBE technique with an optional shipment sequence is illustrated in FIG. 2. Here, blocks 6 to 10 correspond to blocks 1 to 5 of FIG. 1, while block 11 shows how the optional shipment sequence relates to the overall data flow.

The Pegging by Explosion Technique for the Positive Consumption RCPP Problem The Pegging By Explosion technique will initially be described in the context of the PC RCPP problem. Following this initial description, the technique will be extended to apply to the fully general RCPP problem.

The PBE technique functions by reconstructing the production plan in a somewhat modified form. Let $ProdVol^R(\ )$, $StockVol^R(\ )$, $ConsSupVol^R(\ )$, and $ShipVol^R(\ )$ denote the reconstructed production plan. Upon conclusion of the reconstruction, the following properties hold:

$\forall d \in AllDem, \forall td \in AllPer$:

$$ShipVol^R(d, td) = ShipVol(d, td) \quad (1)$$

$\forall j \in AllOpn, \forall tj \in AllPer$:

$$ProdVol^R(j, tj) \leq ProdVol(j, tj) \quad (2)$$

$\forall r \in AllRes, \forall tr \in AllPer$:

$$StockVol^R(r, tr) \leq StockVol(r, tr) \quad (3)$$

$$ConsSupVol^R(r, tr) \leq ConsSupVol(r, tr) \quad (4)$$

In addition, the reconstructed production plan is feasible. In other words, the reconstructed plan achieves the same set of shipments as the original plan, by only using production, stock, and supply that was used in the original.

The description of the PBE algorithm will be broken down into smaller "procedures". The most important procedure in the PBE algorithm is called "Explode Triple". This procedure takes as its argument a triple (d*, td*, IncShipVol) from the shipment sequence and computes an incremental production plan for the triple, denoted by $ProdVol^I(\ )$, $StockVol^I(\ )$, $ConsSupVol^I(\ )$, and $ShipVol^I(\ )$.

When the Explode Triple procedure returns, the following properties hold:

$\forall d \in AllDem, \forall td \in AllPer$:

$$\text{If } d=d^* \text{ and } td=td^*, \text{ then } ShipVol^I(d, td) = IncShipVol \quad (5)$$

$$\text{Otherwise, } ShipVol^I(d, td) = 0 \quad (5)$$

$\forall j \in AllOpn, \forall tj \in AllPer$:

$$ProdVol^R(j, tj) + ProdVol^I(j, tj) \leq ProdVol(j, tj) \quad (6)$$

$\forall r \in AllRes, \forall tr \in AllPer$:

$$StockVol^R(r, tr) + StockVol^I(r, tr) \leq StockVol(r, tr) \quad (7)$$

$$ConsSupVol^R(r, tr) + ConsSupVol^I(r, tr) \leq ConsSupVol(r, tr) \quad (8)$$

$$\text{The incremental production plan is feasible.} \quad (9)$$

Note: In the following description, the symbol "←" represents assignment. Thus, "x←y" means "x is set to the value of y". Also, the symbol "←+" represents adding to, so that "x←+y" means "x←x+y".

The top-level logic of the PBE technique can be described as follows:
Algorithm Pegging-By-Explosion:
[Initialize the reconstructed data and pegging data to zero]
$\forall d \in AllDem, \forall td \in AllPer, \forall j \in AllOpn, \forall tj \in AllPer, \forall r \in AllRes, \forall tr \in AllPer$:
  $ShipVol^R(d, td) \leftarrow 0$
  $ProdVol^R(j, tj) \leftarrow 0$
  $StockVol^R(r, tr) \leftarrow 0$
  $ConsSupVol^R(r, tr) \leftarrow 0$
  $PgdProdVol (j, tj, d, td) \leftarrow 0$
  $PgdStockVol (r, tr, d, td) \leftarrow 0$
  $PgdConsSupVol (r, tr, d, td) \leftarrow 0$
For each triple (d*, td*, IncShipVol)∈ShipSeq, taken in sequence order, do the following:
  Call Explode Triple (d*, td*, IncShipVol).
  [Add the incremental production plan to the reconstructed production plan.]
  $\forall d \in AllDem, \forall td \in AllPer$:
    $ShipVol^R(d, td) \leftarrow + ShipVol^I(d, td)$
  $\forall j \in AllOpn, \forall tj \in AllPer$:
    $ProdVol^R(j, tj) \leftarrow + ProdVol^I(j, tj)$
  $\forall r \in AllRes, \forall tr \in AllPer$:
    $StockVol^R(r, tr) \leftarrow + StockVol^I(r, tr)$
    $ConsSupVol^R(r, tr) \leftarrow + ConsSupVol^I(r, tr)$
  [Peg the incremental production, stock, and consumed supply volumes to the current demand.]
  $\forall j \in AllOpn, \forall tj \in AllPer$:
    $PgdProdVol (j, tj, d^*, td^*) \leftarrow + ProdVol^I(i, tj)$
  $\forall r \in AllRes, \forall tr \in AllPer$:
    $PgdStockVol (r, tr, d^*, td^*) \leftarrow + StockVol^I(r, tr)$
    $PgdConsSupVol (r, tr, d^*, td^*) \leftarrow + ConsSupVol^I(r, tr)$
Report the pegging: $PgdProdVol(\ )$, $PgdStockVol(\ )$, $PgdConsSupVol(\ )$. Stop.

Assuming that the Explode Triple procedure achieves conditions (5), (6), (7), (8), and (9), it is easy to see that, upon completion of the PBE technique, the reconstructed production plan satisfies conditions (1), (2), (3), and (4) above and is feasible. It is also easy to see that $PgdProdVol(\ )$, $PgdStockVol(\ )$, and $PgdConsSupVol(\ )$ form a valid pegging of the original production plan and that this pegging is a feasible partitioning of the production plan. It remains to describe the Explode Triple procedure.

Figure 3:
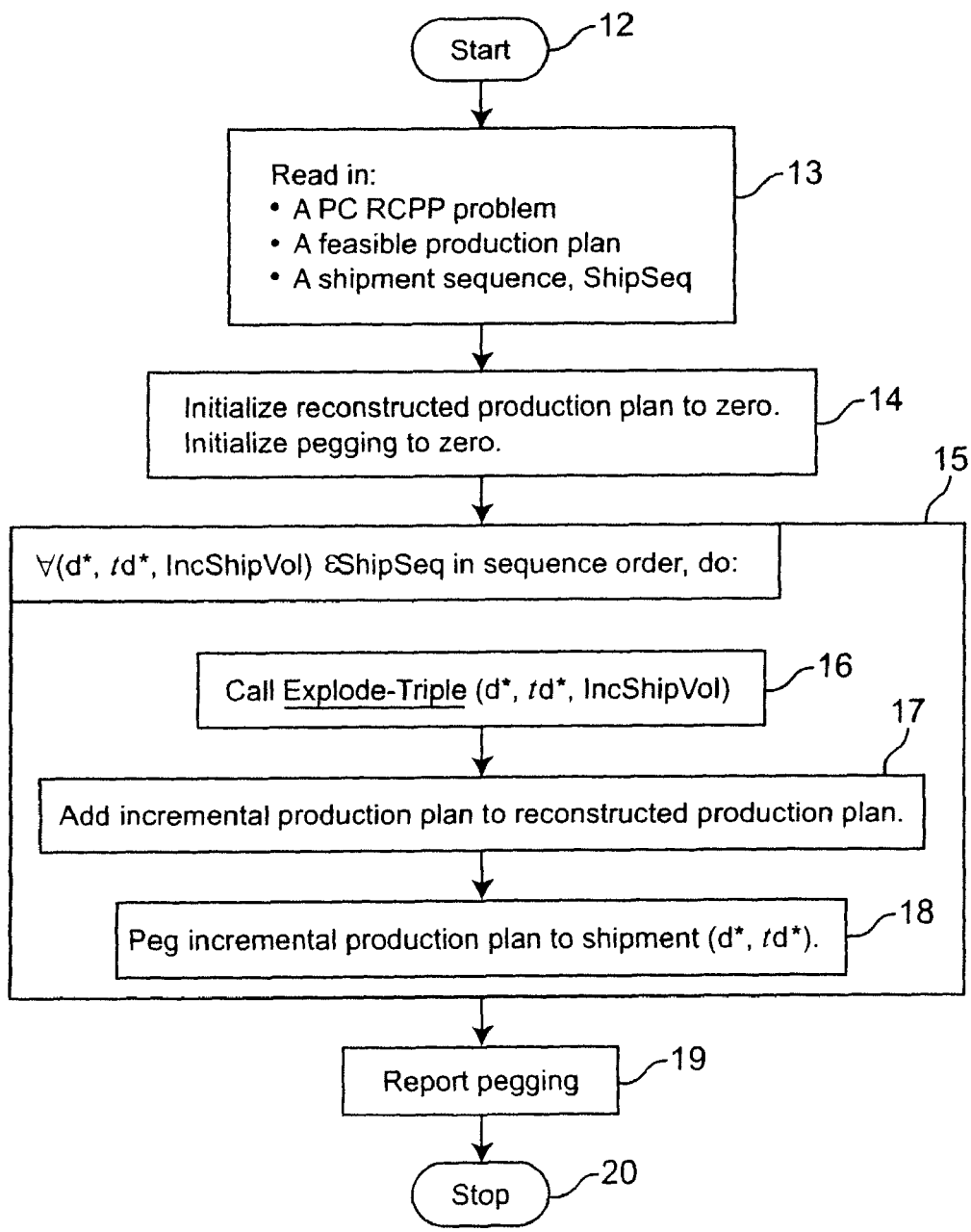
FIG. 3 is a flow diagram illustrating the logic of the PBE algorithm according to the invention.

FIG. 3 illustrates the top level logic of the PBE algorithm implemented in computer software. Upon starting the procedure at start block 12, a PC RCPP problem, a feasible production plan, and a shipment sequence, ShipSeq, are read in at function block 13. In initialization block 14, the reconstructed production is set to zero and pegging is set to zero. Then, processing block 15 for ∀(d*, td*, IncShipVol)∈ShipSeq in order is entered. This processing block iterates through the shipment sequence. The Explode-Triple (d*, td*, IncShipVol) process is called in function block 16. In function block 17, the incremental production plan is added to the reconstructed production plan. Finally, the incremental production plan is pegged to the shipment (d*, td*) in function block 18 to complete the processing in processing block 15. Once this processing is complete, the pegging is reported in function block 19, and the process stops in stop block 20.

Figure 4:
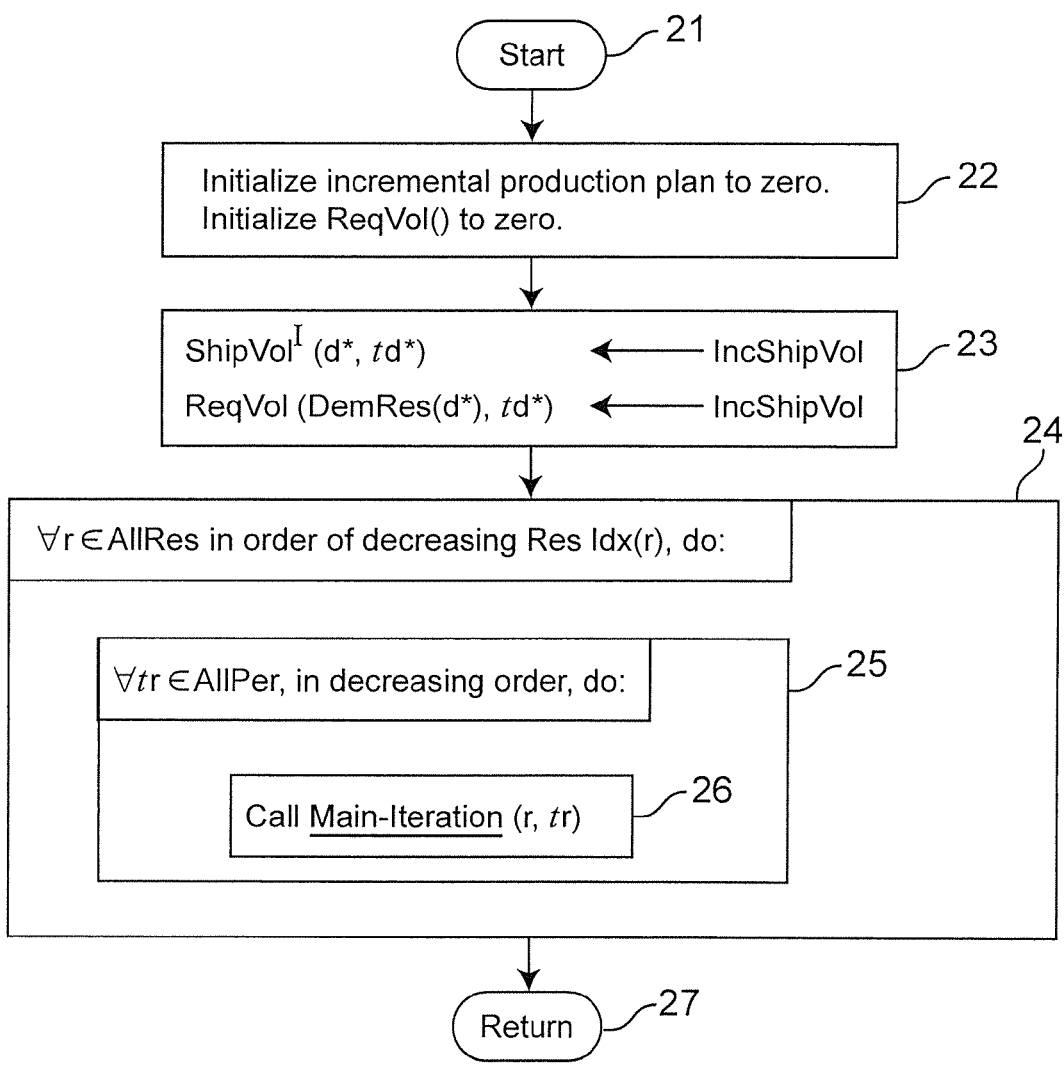
FIG. 4 is a flow diagram of the procedure "Explode-Triple" used in the algorithm of FIG. 3.

FIG. 4 illustrates the top level logic of the Explode-Triple procedure of block 16 in FIG. 3. Upon this process being called at start block 21, initialization block 22 sets the incremental production plan to zero and sets the ReqVol ( ) to zero. Then, in function block 23, $ShipVol^I(d^*, td^*)$ is set to IncShipVol and ReqVol (DemRes (d*, td*) is set to IncShipVol. At this point, nested processing block 24 ∀r∈AllRes, in order of decreasing ResIndx(r), and processing block 25 ∀tr∈AllPer, in decreasing order, are entered. Processing block 25 calls the main-iteration (r, tr) processing block 26. Blocks 24 to 26 show the main iteration (block 26), as contained within the loop through all periods (block 25), as contained with a loop through all resources (block 24). When processing in block 24 and 25 are completed, a return is made to the main program shown in FIG. 3.

Figure 5:
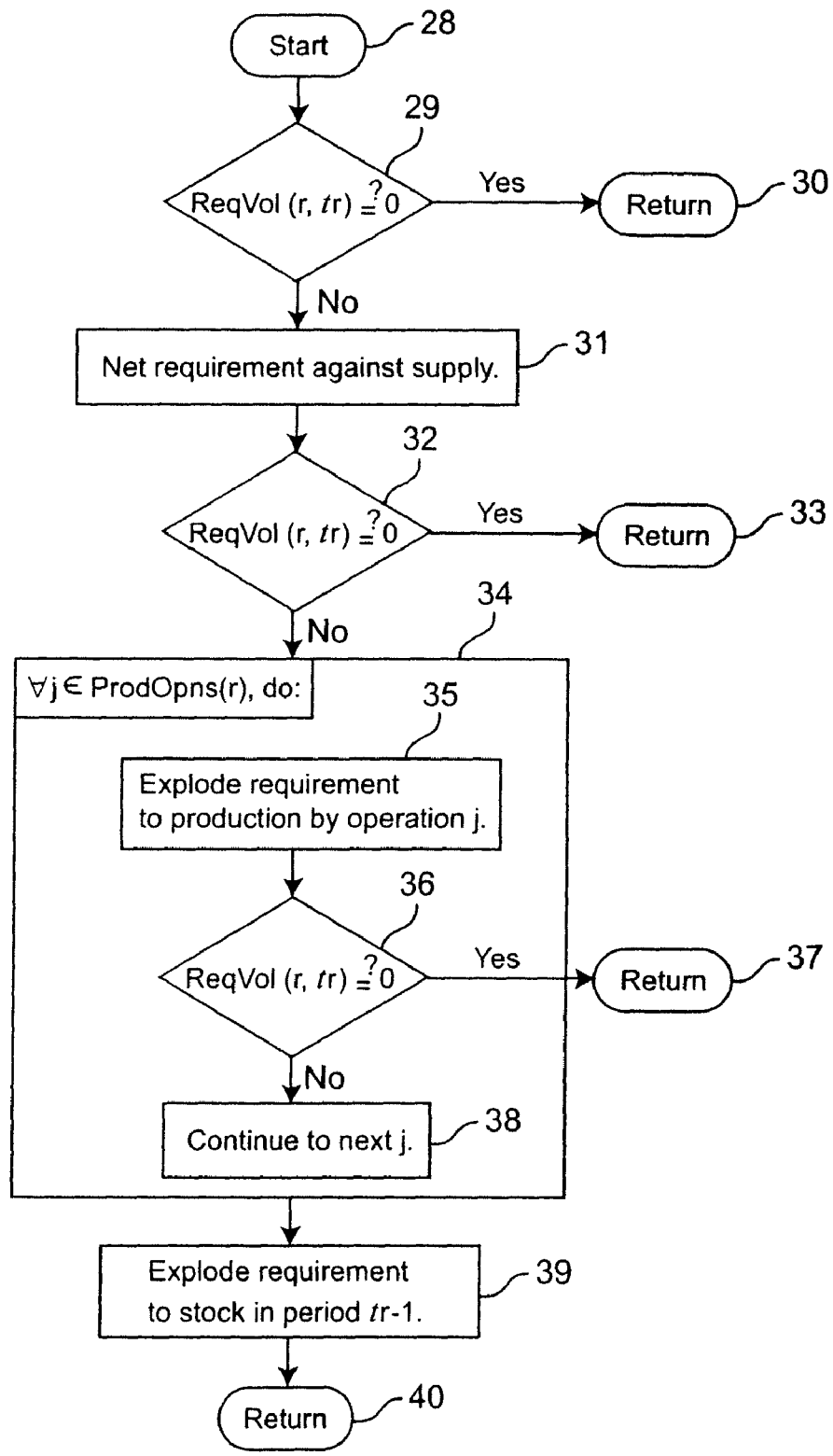
FIG. 5 is a flow diagram of the procedure "Main-Iteration" used in the procedure of FIG. 4.

FIG. 5 illustrates the main iteration 26 of the Explode-Triple procedure of FIG. 4, treating it as a separate procedure for illustration purposes. When called at start block 28, a determination is made in decision block 29 as to whether ReqVol (r, tr)=0. If so, a return is made at block 30 to processing block 26; otherwise, net requirement is netted against supply in function block 31. Then, in decision block 32 a determination is made as to whether ReqVol (r, tr)=0. If so, a return is made at block 33 to processing block 26; otherwise, processing block 34 ∀j∈ProdOpns (r) is entered. The requirement to production is exploded by operation j in function block 35. A determination is made in decision block 36 as to whether ReqVol (r, tr)=0. If so, a return is made at block 37 to processing block 26; otherwise, the processing in processing block 34 continues to the next j in function block 38. Blocks 29, 30, 32, 33, 36, and 37 indicate the various opportunities for the iteration to terminate early. Blocks 34 to 38 indicate the loop through all operations that produce the resource. Blocks 31, 35 and 39 show how the three methods for fulfilling requirements fit into the main iteration. When the processing in block 34 completes, the requirement is exploded to stock in period t−1 in function block 39, and a return is made at block 40 to processing block 26.

The Explode Triple procedure is similar to the explosion technique of Material Requirements Planning. The explosion functions by associating a quantity ReqVol (r, tr) ("requirement volume") with each resource r in each period tr. The Explode Triple procedure calls three more procedures, Net-Against-Supply, Explode-To-Production, and Explode-To-Stock. These four procedures can be described as follows:

Procedure Explode Triple:
Given: A triple (d*, td*, IncShipVol)∈ShipSeq
  ∀d∈AllDem, ∀td∈AllPer:
    ShipVol$^I$(d, td)←0
  ∀j∈AllOpn, ∀tj∈AllPer:
    ProdVol$^I$(j, tj)←0
  ∀r∈AllRes, ∀tr∈AllPer:
    StockVol$^I$(r, tr)←0
    ConsSupVol$^I$(r, tr)←0
    ReqVol (r, tr)←0
  ShipVol$^I$(d*, td*)←IncShipVol
  ReqVol (DemRes (d*), td*)←IncShipVol
Do the following for each resource r∈AllRes in order of decreasing ResIdx (r):
  Do the following main iteration for each period tr∈AllPer in decreasing order:
    If ReqVol (r, tr)=0, skip this main iteration.
    Call Net-Against-Supply (r, tr).
    If ReqVol (r, tr)=0, terminate this main iteration.
    Do the following for each operation j∈ProdOpns (r):
      Call Explode-To-Production (r, j, tr).
      If ReqVol (r, tr)=0, terminate this main iteration.
    Call Explode-To-Stock (r, tr).
Return.

Procedure Net-Against-Supply:
[Net the requirement against consumed supply.]
Given: r∈AllRes, tr∈AllPer.
ConsSupVol$^I$(r, tr)←Min ((ConsSupVol (r, tr)−ConsSupVol$^R$ (r, tr)), ReqVol (r, tr)) ReqVol (r, tr)←+−ConsSupVol$^I$(r, tr)
Return.

Procedure Explode-To-Production:
[Explode the requirement to production by operation j.]
Given: r∈AllRes, j∈ProdOpns (r), tr∈AllPer.
ProdVol$^I$(j, tr)←Min ((ProdVol (i, tr)−ProdVol$^R$(j, tr)), ReqVol (r, tr)) ∀r'∈BOR (j):
  ∀tr'∈AllPer:
    ReqVol (r', tr')←+UsageRate (j, tr, r', tr')*ProdVol$^I$(j, tr)
    ReqVol (r, tr)←+−ProdVol$^I$(j, tr)

Return.
Procedure Explode-To-Stock:
[Explode the requirement to stock from period tr−1.]
Given: r∈AllRes, tr∈AllPer.
If tr=1, return.
StockVol$^I$(r, tr−1)←Min ((StockVol (r, tr−1)−StockVol$^R$(r, tr−1)), ReqVol(r, tr))
ReqVol (r, tr−1)←+StockVol$^I$(r, tr−1)
ReqVol (r, tr)←+−StockVol$^I$(r, tr−1)
Return.

It is easy to see that Explode Triple computes an incremental production plan that satisfies conditions (5), (6), (7), and (8) above. It can also be shown that condition (9) is satisfied, by verifying that ReqVol(r, tr)=0 at the end of each main iteration. In MRP terms, this means that there are no "net requirements". In fact, there are a number of major differences between the Explode Triple procedure and a conventional MRP explosion:

Explode Triple never has any net requirements.
  Explode Triple can explode a requirement to multiple alternative operations for producing the same product.
  Explode Triple can explode a requirement to production in an earlier period (by exploding to stock).

All of these differences are enabled by exploiting knowledge of the pre-existing production plan.

The main iteration of Explode Triple fills the requirement, ReqVol (r, tr), using three alternative procedures: Net-Against-Supply, Explode-To-Production, and Explode-To-Stock. The order in which these three procedures are called is arbitrary: they can actually be called in any order. Also, the calls to Explode-To-Production for each operation in ProdOpns (r) can be done in any order, and indeed, these calls can be interlaced with the calls to Net-Against-Supply and Explode-To-Stock in any order. In general, using different alternative orderings for these procedure calls will result in different but equally valid peggings. Using any such ordering is considered to be a version of the PBE technique.

Depending on the application, there may be business reasons for choosing one ordering instead of another. For example, the ordering used in the algorithm description above has the effect of pegging production in the latest possible period to the current shipment. Alternatively, calling Explode-To-Stock before Explode-To-Production would have the effect of pegging production in the earliest possible period to the current shipment.

Extension to the General RCPP Problem

The general RCPP problem is allowed to have negative consumption. Unfortunately, when negative is consumption is allowed, it is easy to construct examples of RCPP problems and production plans such that no feasible partitioning of the production plan exists. Thus the PBE technique for PC RCPP problems, which is designed to construct a feasible partitioning, cannot be expected to function properly in the presence of negative consumption.

Given an RCPP problem with negative consumption and a corresponding feasible production plan, consider the following definitions:

$\forall j \in AllOpn, \forall tj \in AllPer, \forall r \in BOR(j), \forall tr \in AllPer$:

If $UsageRate(j, tj, r, tr) < 0$:

Let $NegUsageRate(j, tj, r, tr) = -UsageRate(j, tj, r, tr)$

If $UsageRate(j, tj, r, tr) \geq 0$:

-continued

Let $NegUsageRate(j, tj, r, tr) = 0$ $\forall r \in AllRes, \forall tr \in AllPer$.

Let $NegConsVol(r, tr) =$ $$\sum_{\substack{j \in ConsOpns(r) \\ tj \in AllPers}} NegUsageRate(j, tj, r, tr) * ProdVol(j, tj)$$

Thus, NegConsVol (r, tr) is the total negative consumption of resource r in period tr.

To see how the PBE technique is extended to handle the negative consumption case, define the auxiliary problem and auxiliary production plan, by making the following modifications to the original RCPP problem and production plan:
$\forall r \in AllRes$:
    Add an "auxiliary" operation, j*.
    Let ProdRes (j*)=r.
    Let BOR (j*)=Ø.
    $\forall tr \in AllPer$:
        Let ProdVol (j*, tr)=NegConsVol (r, tr).
$\forall j \in AllOpn, \forall tj \in AllPer, \forall r \in BOR (j), \forall tr \in AllPer$:
    If UsageRate (j, tj, r, tr)<0:
        UsageRate (j, tj, r, tr)←0
In other words, the negative consumption is replaced by production from auxiliary operations and the negative usage rates are set to zero. The auxiliary problem and production plan have two important properties:
    The auxiliary problem is a Positive Consumption RCPP problem.
    The auxiliary production plan is feasible for the auxiliary problem.
The PBE technique can be extended to handle negative consumption in either of the following two ways:
    Explicit transformation: Explicitly construct the auxiliary problem and production plan, apply the PBE technique to them, and then transfer the resulting pegging back into the original problem and production plan.
    Implicit transformation: Work with the original problem and production plan, by adding steps to the PBE technique that are mathematically equivalent to what the PBE technique would be doing with the auxiliary problem and production plan.
More specifically, the implicit transformation approach makes the following modifications to the original algorithm. In the Explode-To-Production procedure, any value of UsageRate(j, tr, r', tr') that is negative is treated as zero. In addition to pegging the production volumes, etc., it also explicitly pegs the negative consumption volumes, by working with PgdNegConsVol (r, tr, d, td), NegConsVol$^R$(r, tr), and NegConsVol$^I$(r, tr). A call to the following procedure is added (in any order) to the Explode-For-PBE procedure:
Procedure Explode-To-Negative-Consumption:
Given: r∈AllRes, tr∈AllPer.
NegConsVol$^I$(r, tr)←Min ((NegConsVol (r, tr)−NegConsVol$^R$(r, tr)), ReqVol (r, tr)) ReqVol (r, tr)←+−NegConsVol$^I$(r, tr)
Return.

The pegging constructed by the PBE technique in the negative consumption case is a feasible partitioning of the auxiliary production plan with respect to the auxiliary problem. This means that the pegging has partitioned the original production plan into a set of disjoint portions associated with each shipment, where each portion defines a feasible production plan for achieving its corresponding shipment, if negative consumption is treated as production by an auxiliary operation. This is a precise way of saying that the pegging is plausible in the presence of negative consumption.

Substitution

The definition of the RCPP problem can be extended to include substitution in the BOR structure. Specifically, given any operations, for any resource r∈BOR (j), an RCPP problem with substitution may specify a set of substitute resources, any of which can be consumed in place of r, and with potentially different usage rates, etc. For a detailed formulation of the RCPP problem with substitution, see U.S. Pat. No. 5,630,070.

Any RCPP problem with substitution can be transformed into an equivalent RCPP problem without substitution by the following technique. For each operation j and each resource r∈BOR (j) that has substitution, modify to the problem as follows:
Add an extra capacity resource, r*.
Add r* to BOR (j).
Add an extra operation, j*.
Let ProdRes (j*)=r*.
Let BOR (*)=r.
For each substitute resource r' associated with j and r, do the following:
    Add an extra operation, j**
    Let ProdRes (j**)=r*.
    Let BOR (j**)=r'.
Remove r from BOR (j).
Also, the usage rate data for the new objects is copied from the usage rates in the original data as appropriate. This transformed problem is equivalent to the original problem in the sense that it leads to an equivalent set of feasible production plans. Also, the transformed problem has no substitution. The PBE technique can be extended to handle substitution either by using an explicit transformation approach or by using an implicit transformation approach, with respect to the transformation defined above.

Pegging Infeasibilities

Some RCPP systems allow the production plan that they produce to be infeasible. In particular, the resource constraints are sometimes allowed be to violated, perhaps with a penalty in an objective function. The PBE technique can be extended to cover this case, by using a problem reduction approach. Given an RCPP problem and a production plan that violates some of the resource constraints, but is otherwise feasible, define the following transformed problem. For each resource r and each period tr whose resource constraint is violated, modify the problem and production plan as follows:
Let ViolVol (r, tr)=The amount by which the left-hand side of the resource constraint on tr and r exceeds the right-hand-side ("violation volume").
Add an extra operation, j*.
Let ProdRes (j*)=r.
Let BOR (j*)=Ø.
Let ProdVol (j*, tr)=ViolVol (r, tr).
It is easy to see that the transformed production plan is feasible for the transformed problem.

This transformation can be used to extend the PBE technique to handle resource constraint violations by applying either an explicit transformation approach or an implicit transformation approach. In either case, the production pegging for the extra operations has special significance. For any demand d and any period td, PgdProdVol (j*, tr, d, td) is the amount of the violation of the resource constraint for resource r in period tr that is pegged to the shipment to demand d in period td. (It might be notated as PgdViolVol (r, tr, d, td).)

Note that, when using the implicit approach, the use of ViolVol (r, tr) to fill the requirement ReqVol (r, tr) in the Explode-For-PBE procedure can be done in any order compared to the other procedures for filling the requirement (Net-To-Supply, Explode-To-Production, Explode-To-Stock, and Explode-To-Negative-Consumption). Normally, it would be done last, since violating a resource constraint would normally be done only as a last resort. A special case of RCPP where resource constraints can be violated is MRP. Thus the above techniques can be used to do pegging of a pre-existing MRP solution.

While the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. A non-transitory computer readable medium containing code implementing a method for constructing a pegging of a pre-existing production plan for a resource-constrained production planning (RCPP) problem, said method comprising the step of constructing the pegging after the production plan already had been generated, wherein the plan includes individual resources and individual shipments, and the pegging is an association between the individual resources in the plan and the individual shipments in the plan that reflects for a given shipment in the plan which resources were used specifically to enable that shipment; and (A) wherein the step of constructing the pegging of the pre-existing production plan comprises the steps of:

reconstructing a modified version of the pre-existing production plan by an incremental allocation technique, and then applying a Pegging By Monitoring technique to the reconstructed production plan in order to produce the pegging; and (B) wherein the step of reconstructing a modified version of the pre-existing production plan is accomplished by a series of "explosion" steps similar to an explosion technique of Material Requirements Planning (MRP); and (C) wherein the method is useable on Positive Consumption resource-constrained production planning (RCPP) problems and comprises the steps of:

reading in a Positive Consumption RCPP problem, reading in a feasible pre-existing production plan for the problem, either reading in a shipment sequence corresponding to the shipments in the pre-existing production plan, or computing a default shipment sequence, initializing the reconstructed production plan to zero, initializing the pegging to zero, proceeding through the triples (d*, td*, IncShipVol) in the shipment sequence, with each demand d* in period td*, and performing the following three steps:

employing a specialized explosion technique to construct an incremental production plan (denoted by $ProdVol^I(\ )$, $StockVol^I(\ )$, $ConsSupVol^I(\ )$, and $ShipVol^I(\ )$) that specifies a feasible means of enabling a shipment of IncShipVol units to demand d* in period td* without using any resources that have already been pegged, adding the incremental production plan to the reconstructed production plan, and pegging the incremental production plan to the current shipment (d*, td*), and reporting the pegging; and (D) wherein the specialized explosion technique comprises the steps of:

initializing the incremental production plan to zero, associating a quantity, ReqVol (r, tr), with each resource r in each period tr, initializing all values of ReqVol (r, tr) to zero, setting $ShipVol^I$ (d*, td*) to IncShipVol, setting ReqVol (DemRes (d*), td*) to IncShipVol, proceeding through each resource r ∈ AllRes in order of decreasing ResIdx (r) and performing the following five steps:

proceeding through each period tr ∈ AllPer in decreasing order and performing the following four steps:

netting the requirement against supply,

∀j∈ ProdOpns (r), performing the following step:

exploding the requirement to production by operation j, and exploding the requirement to stock in period tr−1.

2. The computer readable medium recited in claim 1, wherein the step netting the requirement against supply comprises the steps of:

setting $ConsSupVol^I$(r, tr)←Min((ConsSupVol(r, tr)−$ConsSupVol^R$(r, tr)), ReqVol (r, tr)), and setting ReqVol(r, tr)←+−$ConsSupVol^I$(r, tr), and wherein the step exploding the requirement to production by operation j comprises the steps of:

setting $ProdVol^I$(j, tr)←Min((ProdVol(j, tr)−$ProdVol^R$(j, tr)), ReqVol (r, tr)), ∀r' ∈ BOR (j), where BOR is Bill-of-Resources, performing the following three steps:

∀tr' ∈ AllPer, performing the following step:

setting ReqVol (r', tr')+UsageRate (j, tr, r', tr')* $ProdVol^I$ (j, tr), setting ReqVol (r, tr)←+−$ProdVol^I$ (j, tr), and wherein the step exploding the requirement to stock in period tr−1 comprises the steps of:

if tr=1, doing nothing, but otherwise performing the following three steps:

setting $StockVol^I$ (r, tr−1)←Min ((StockVol (r, tr−1)−$StockVol^R$ (r, tr−1)), ReqVol (r, tr)), setting ReqVol (r, tr−1)←+$StockVol^I$ (r, tr−1), and setting ReqVol (r, tr)←+−$StockVol^I$ (r, tr−1).

3. The computer readable medium recited in claim 1, wherein the steps netting the requirement against supply, exploding the requirement to production by operation j, and exploding the requirement to stock in period tr−1 are performed in any order, where this method is called Pegging By Explosion Technique for Positive Consumption RCPP Problems, or PC-PBE technique.

4. The computer readable medium recited in claim 3 (the code implementing the PC-PBE technique), where in the method is used to construct a pegging of a production plan for any RCPP problem, by using the method within the steps of:

explicitly constructing an auxiliary problem and production plan identical to the original problem and production plan, except that for each resource, an "auxiliary" operation is added that produces that resource and consumes no resources, the negative consumption of each resource is replaced with production by the auxiliary operation for that resource, and all negative usage rates are set to zero, and applying the PC-PBE technique to the auxiliary problem and production plan, and transferring the resulting pegging back into the original problem and production plan.

5. The computer readable medium recited in claim 3 (the code implementing the PC-PBE technique), wherein the method is used to construct a pegging of a production plan for any RCPP problem, by using the method within the steps of:
- conceptually defining the auxiliary problem and production plan identical to the original problem and production plan, except that
  - for each resource, an "auxiliary" operation is added that produces that resource and consumes no resources,
  - the negative consumption of each resource is replaced with production by the auxiliary operation for that resource, and
  - all negative usage rates are set to zero,
- working with the original problem and production plan, and
- performing a sequence of steps that are mathematically equivalent to those that the PC-PBE technique would be performing, if it were being applied to the auxiliary problem and production plan, whereby the method is called Pegging By Explosion Technique for RCPP Problems, or the PBE technique.

6. The computer readable medium recited in claim 5 (the code implementing the PBE technique), wherein the method is used to construct a pegging of a production plan for a variant of an RCPP problem that has been generalized so as to allow substitution in a Bill-of-Resources (BOR) structure, by using the method within the steps of
- conceptually defining a transformed RCPP problem and production plan that is equivalent to the original problem and production plan, but has no substitution,
- working with the original problem and production plan, and
- performing a sequence of steps that are mathematically equivalent to those that the PBE technique would be performing, if it were being applied to the transformed problem and production plan.

7. The computer readable medium recited in claim 5 (the code implementing the PBE technique), wherein the method is used to construct a pegging of a production plan for a variant of an RCPP problem that has been generalized so as to allow substitution in a Bill-of-Resources (BOR) structure and to permit violations of the resource constraints, by using the method within the steps of:
- conceptually defining a transformed RCPP problem and production plan that is equivalent to the original problem and production plan, but has no substitution and does not violate any of the resource constraints,
- working with the original problem and production plan, and
- performing a sequence of steps that are mathematically equivalent to those that the PBE technique would be performing, if it were being applied to the transformed problem and production plan.

8. The computer readable medium recited in claim 7, specifically applied to construct a pegging of the solution of a Material Requirements Planning problem.

9. The computer readable medium recited in claim 3, wherein the method is restricted to be used only on problems in which Nperiods=1, where the method is made simpler to implement in the following ways:
- by eliminating the concept of a period from all of the data and notation;
- by eliminating the distinction between material resources and capacity resources;
- by deleting all references to stock volume (StockVol ( )) and its pegging; and
- by removing the exploding the requirement to stock step from the method.

10. The computer readable medium recited in claim 3, wherein the method is restricted to be used only on problems in which each resource can only be produced by at most one operation, where the method is made simpler to implement in the following ways:
- by eliminating the concept of an operation from all of the data and notation, eliminating all data associated with an operation and replacing it by corresponding data associated with a product, so that, e.g., ProdVol (j, tj) for operation j is replaced by ProdVol (r, tr) for product resource r;
- by eliminating the following two steps from method:
  - $\forall j \in$ ProdOpns (r), performing the following step:
    - exploding the requirement to production by operation j;
- by replacing the above two steps with the following step:
  - exploding the requirement to production, if the resource is a product.

11. The computer readable medium recited in claim 3, wherein the method is restricted to be used only on problems in which Nperiods=1 and in which each resource can only be produced by at most one operation, where the method is made simpler to implement in the following ways:
- by eliminating the concept of a period from all of the data and notation;
- by eliminating the distinction between material resources and capacity resources;
- by deleting all references to stock volume (StockVol ( )) and its pegging;
- by removing the exploding the requirement to stock step from the method,
- by eliminating the concept of an operation from all of the data and notation, eliminating all data associated with an operation and replacing it by corresponding data associated with a product, so that, e.g., ProdVol (j, tj) for operation j is replaced by ProdVol (r, tr) for product resource r;
- by eliminating the following two steps from method:
  - $\forall j \in$ ProdOpns (r), performing the following step:
    - exploding the requirement to production by operation j;
- by replacing the above two steps with the following step:
  - exploding the requirement to production, if the resource is a product.

* * * * *